(12) United States Patent
Kenk

(10) Patent No.: US 6,774,345 B1
(45) Date of Patent: Aug. 10, 2004

(54) METHOD AND DEVICE FOR PREPARING FOODSTUFFS BY BAKING INSIDE AN OVEN CAVITY

(75) Inventor: Ernst Kenk, Paris (FR)

(73) Assignee: Fritson AG, Cham (CH)

( * ) Notice: Subject to any disclaimer, the term of this patent is extended or adjusted under 35 U.S.C. 154(b) by 0 days.

(21) Appl. No.: 09/979,268

(22) PCT Filed: May 25, 2000

(86) PCT No.: PCT/CH00/00295
§ 371 (c)(1),
(2), (4) Date: Apr. 17, 2002

(87) PCT Pub. No.: WO00/71010
PCT Pub. Date: Nov. 30, 2000

(30) Foreign Application Priority Data

May 25, 1999 (CH) .................................. 965/99

(51) Int. Cl.[7] .................................................. H05B 1/02
(52) U.S. Cl. ....................... 219/506; 219/494; 219/720; 219/714; 3392/360; 99/325; 99/468
(58) Field of Search ................................ 219/494, 506, 219/411–413, 681, 579, 497, 720, 714; 392/360, 356; 99/325, 359, 342, 468

(56) References Cited

U.S. PATENT DOCUMENTS

| | | | |
|---|---|---|---|
| 4,780,588 A | * 10/1988 | Edamura | ...................... 219/506 |
| 5,275,090 A | * 1/1994 | Connell | ......................... 99/336 |
| 5,315,919 A | 5/1994 | Hoeberigs | |
| 5,426,280 A | * 6/1995 | Smith | ........................... 219/506 |
| 5,445,073 A | 8/1995 | Gilwood | |
| 5,539,187 A | * 7/1996 | Smith et al. | ................. 219/681 |
| 5,818,014 A | * 10/1998 | Smith et al. | ................. 219/679 |
| 5,868,064 A | 2/1999 | Ubert et al. | |

FOREIGN PATENT DOCUMENTS

| | | |
|---|---|---|
| EP | 0 379 755 | 8/1990 |
| EP | 0 396 470 | 11/1990 |
| EP | 0 636 334 | 2/1995 |
| WO | 97/11628 | 4/1997 |
| WO | 97/37575 | 10/1997 |
| WO | 89/12417 | 6/1998 |

OTHER PUBLICATIONS

International Search Report, PCT/NL97/00172; Aug. 4, 1997.

* cited by examiner

Primary Examiner—Mark Paschall
(74) Attorney, Agent, or Firm—Morgan, Lewis & Bockius LLP

(57) ABSTRACT

The invention relates to a method and device for carrying out the automated preparation of foodstuffs by portions, especially french fries made of potato sticks or the like that are previously fried in oil, by baking them inside an oven cavity (15). The oven cavity (15) is surrounded by a casing (1) which is provided with a bar code reader (9) that is connected to a control (44). Said control enables or refuses the actuation of the device according to the information contained in the bar code that has been read, and/or controls the baking time and/or the baking temperature and/or a preheating temperature.

6 Claims, 2 Drawing Sheets

METHOD AND DEVICE FOR PREPARING FOODSTUFFS BY BAKING INSIDE AN OVEN CAVITY

TECHNICAL AREA

This invention relates to a procedure and device for the automated, batch-wise preparation of foodstuffs such as French fries out of potato sticks preliminarily deep-fried in oil or the like by baking in a furnace cell without renewed deep-frying in oil.

PRIOR ART

A device of this type is known from WO 89/12417, for example. In this publication, the lower sealing element of the furnace cell is comprised of a pot or pan-like element with an inclined floor, which receives the foodstuffs during heating, which is rotated around an inclined axis while heating, and is tilted downward as a whole around a horizontal axis for emptying. Heating elements along with a fan for circulating the air inside the furnace cell are provided in its upper part inside the furnace cell. Another fan in a casing wall brings about a vacuum in the casing, but no venting of the furnace cell is provided during the baking process. A type of slider seals the furnace cell from above. Situated over the slider is an insertion hole accessible from outside for standardized portion shells sealed with a film for the foodstuffs to be prepared. The insertion hole has a cutting device for automatically opening the portion shell inserted downward into it with the film. The slider abutting the furnace cell from above is opened during the automatic opening of the portion shells. The known device is designed as a tabletop model.

DESCRIPTION OF THE INVENTION

The object of the invention in particular is to provide a device of the aforementioned type that ensures an optimal baking process depending on the composition of the French Fries, and hence leads to an improved result of the end product.

This object is achieved according to claim 1 by virtue of the fact that the furnace cell is surrounded by a casing that is provided with a barcode reader, and connected with a controller, and that the latter allows or disallows activation of the device as a function of the information contained in the respectively read barcode, and/or regulates the baking time and/or baking temperature and/or a preheating temperature.

Advantageous, and hence preferred, embodiments of the device according to the invention are described in the dependent claims.

The device according to the invention can be used to special advantage in particular where conventional, oil-operated deep fryers cannot be installed due to the smells they produce, or where installing conventional deep fryers is not worth it due to the outlay, e.g., of exhaust devices or the like. In addition, the device according to the invention requires no oil, which must otherwise be supplied, changed at regular intervals and disposed at ever-increasing costs. Therefore, the device according to the invention can also be used where French Fries or the like only have to be made occasionally. Finally, the device according to the invention, in particular the tabletop version, requires no permanent installation, and can simply be operated using an electrical outlet given a suitable design.

Claim 6 also relates to a procedure for the automated, portion-by-portion preparation of such foodstuffs.

BRIEF EXPLANATION OF FIGURES

In the following, the invention will be described in greater detail based on an embodiment in conjunction with the drawing. Shown on.

WAYS OF IMPLEMENTING THE INVENTION

Figure 1:
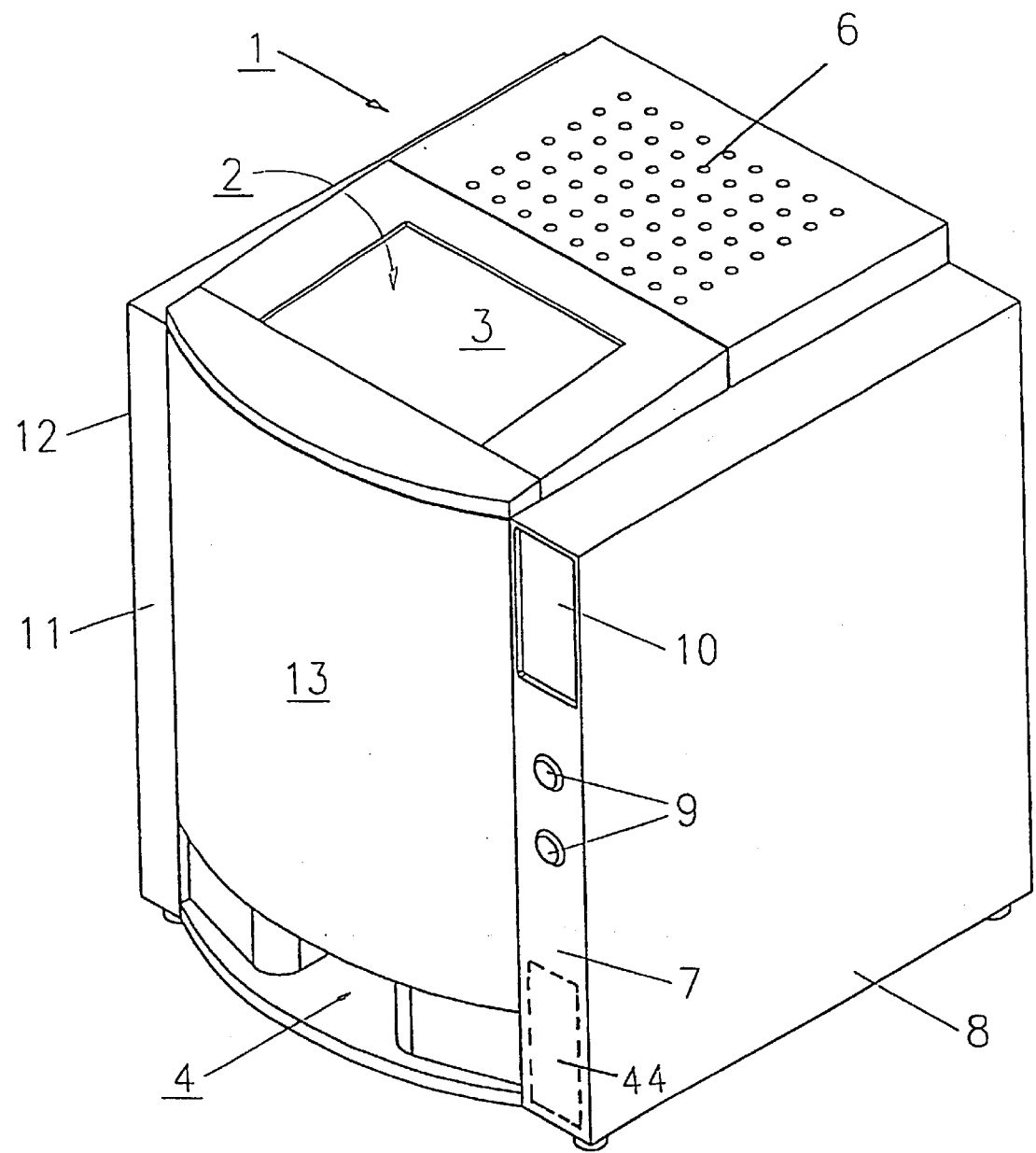
FIG. 1 is a perspective view of a device according to the invention from outside.

FIG. 1 shows a device according to the invention as it would look from outside to the user. It is designed as a tabletop model, and encompasses an approximately dice-shaped casing 1 with a height of less than 60 cm, preferably less than 55 cm. A funnel-shaped fill hole 2 is provided at the top of the casing 1 to fill in the foodstuffs to be prepared, and can be sealed with a sealing cover 3. A shaft-like discharge hole 4 whose front side is freely accessible is provided at the bottom of the casing 1 to remove the completely prepared foodstuffs. A container, e.g., a shell for holding foodstuffs, can be inserted into this discharge hole. The upper casing wall is provided with openings 6 behind the fill hole 2, in the form of a hole pattern on FIG. 1, through which waste air from the device can exit to the outside. The casing 1 has controls on the front side, or rather the anterior narrow side 7 of the right side wall 8 as viewed on FIG. 1, while FIG. 1 only provides a diagrammatic view of two buttons as the input means 9 and only a display field as the display means 10. The input means 9 can encompass several toggle, push-button or rotary switches, but at the very least a barcode reader as well. The portion of the front wall of the casing 1 over the discharge hole 8 and between the two frontal narrow sides 7 and 11 of the side walls 8 and 12 is designed as a door 13, which is mounted to one of the two side walls 8 or 12.

Figure 2:
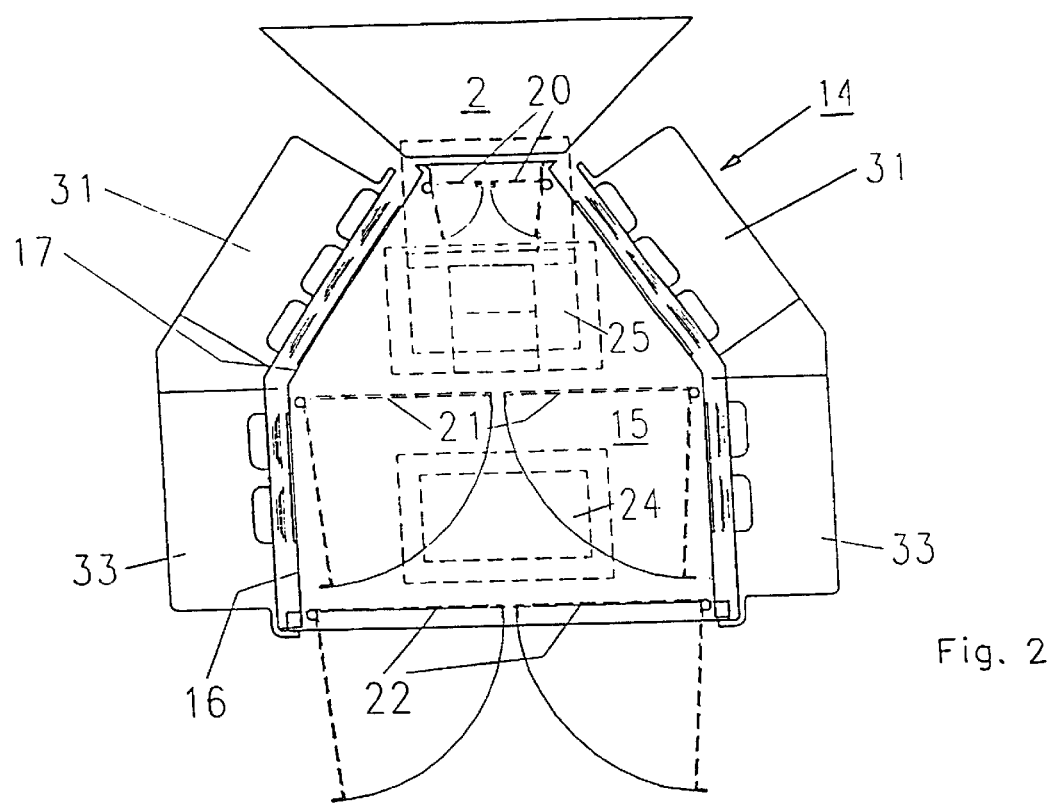
FIG. 2 is a diagrammatic view of the furnace of the device from the front.
Figure 3:
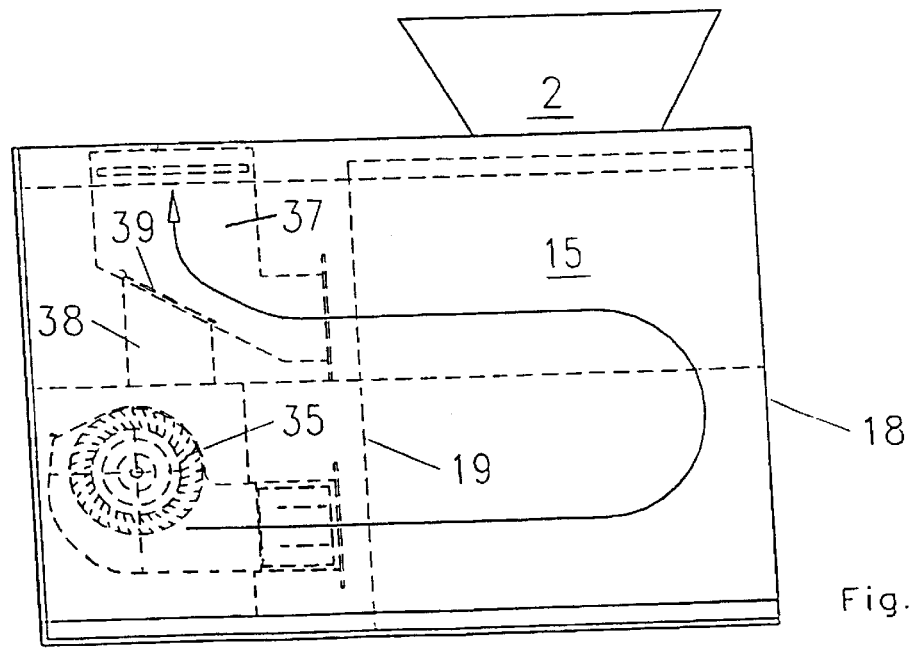
FIG. 3 is a side view of the depiction on FIG. 2.

Situated inside the casing 1 is a furnace, which is marked 14 as a whole. FIGS. 2 and 3 show the furnace as depicted by itself. The centerpiece of the furnace 14 is a furnace cell 15. This is held in a supporting structure of the furnace, and can be dismantled as a whole from this supporting structure in only a few steps with the casing door 13 open. In the dismantled state, the furnace cell 14 can advantageously be simply cleaned in a commercial dishwashing machine, for example. The furnace cell 15 exhibits lower vertical side wall parts, above which are upper, inwardly inclined side wall parts. Of the side wall parts, only the lower left 16 and upper left 17 have been designated. The furnace cell is covered from the front and back by a front wall 18 and a back wall 19.

A pair of lid flaps 20 laterally mounted on the upper side wall parts 17 forms the top seal of the furnace cell; these lid flaps can flipped open downwardly in the opposite direction from a closed horizontal position.

In the middle area of the furnace cell 15, about halfway up its height, a pair of grates 21 that can swivel downward in opposite directions from a horizontal position are mounted to the side wall parts 16.

The furnace cell 15 is sealed from below by a pair of floor flaps mounted along the lower edges of the bottom side wall parts 16, which can again be swiveled downward in opposite directions from a horizontal position.

A heating fan 35 is built in to heat up the furnace cell 15. It aspirates and heats air, blowing it into the furnace cell 15 through its inlet hole 24.

Finally, the casing 1 of the device incorporates at least one controller 44 (only hatched on FIG. 1) for controlling its various automatic or semiautomatic functions, as well as several sensors (not shown) for detecting the various operating states that arise from the following functional description.

To activate the device, the furnace 14 is first preheated through actuation of the input means 9, until a preset preheating temperature has been reached in the center of the furnace cell 15. For example, once the preheating temperature has been reached, operational readiness is signaled via display means 10. The user must now use the input means 9 to specify a baking time suitable for the respective foodstuffs to be prepared, and slide discharge shell 5 in to the discharge hole 4. The baking time can be set either manually, e.g., based on instructions on the package of the foodstuff to be prepared; preferably, the corresponding input, as already mentioned, is incorporated on a barcode printed on the package that indicates the optimal baking time and read by a barcode reader on the device. The barcode could here also advantageously contain additional information, e.g., in particular the expiration date of the foodstuff and/or other information about it type and manufacture. Based on such additional information, the controller 44 could approve the function of the device or disapprove, or at least display warnings via the display means 10. For example, putting a barcode on the packaging would activate the furnace only given clear detection by the barcode reader. This prevents foreign packages from being used. The same bag can also be prevented from being used twice, since the controller stores the codes on the respective packages, and can disallow the baking process if the same barcode is read again.

Depending on the time of year and type of potato, fluctuations may arise in terms of water, sugar and starch content, which have a considerable influence on the baking outlet of the French Fries. To ensure an optimal baking process, the furnace would have to calculate an individual baking program as a function of the seasonal fluctuations in the various parameters for the potatoes. As mentioned above, additional information can be contained in the barcodes on the packages. Including information about the potato composition allows the controller 44 to compute an individual baking program for the furnace, and in that way achieve an optimal result for the end product.

The barcode is read in using a barcode reader or barcode reader window, which is placed on the front narrow side 7 of the casing 1. The package with the corresponding barcode is pulled from the top down on the barcode reader window at as constant a speed as possible, during which the barcode faces the barcode reader window, even contacting it while reading (touch). To ensure that the barcode is moved precisely along the barcode reader window while being read in, a stop edge is situated a specific distance from the barcode reader window. The job of this stop edge is to prevent reading errors from arising while reading gin the barcode if the package should slip.

After these preparatory operations/settings, the user must/can open the sealing flap 3 of the fill hole 2, which to that point had preferably been closed, and pour the foodstuffs provided for preparation into the funnel-shaped fill hole and onto the closed, i.e., horizontal lid flaps 20, which seal the furnace cell 15 from above. So that the lid flaps 20 of the furnace cell can open and the foodstuffs can continue to fall further down into the furnace cell on the swiveling grate, the sealing flap 3 of the fill hole 2 must be closed again. As a result, the sealing flap 3 along with the lid flaps 20 of the furnace cell form an inlet sluice, which ensures that as little heat can escape from the furnace cell 15 while it is being filled, and prevents the temperature from dropping off too sharply. This is advantageous for the desired achievement of a short preparation time for the foodstuffs.

If not already in operation, the heating fan 35 is activated. Because the inlet hole 24 in the furnace cell 15 for the hot air from the heating fan 35 is situated below and the discharge hole 25 for the waste air from the furnace cell is situated above the grate 21, the heating air must pass through the grate 21, and hence the foodstuffs lying thereupon. This results in a very efficient and rapid heating of the foodstuffs, and transports away the steam exiting the foodstuffs, fat vapors, etc.

As soon as the desired baking degree has been reached or the preset baking time has expired, the two grates 21 are automatically swiveled downward, along with the two floor flaps 22, so that the foodstuffs can continue to fall further down into the shell 5 set up beforehand.

Because the described device operates according to the fall-through principal relative to the foodstuffs from the top down exclusively through exposure to gravity, expensive mechanisms to transport the foodstuffs into and through the device are not required. Because any pieces of the foodstuffs, e.g., crumbs and the like, necessarily fall downward out of the device along with the foodstuffs, it cleans itself to remove these problematic residues during operation. The mentioned front door 13 can be used to readily access the furnace cell, and hence practically all, but at least all hot parts that come into contact with the foodstuffs, wherein the parts can be entirely dismantled form the device and cleaned in a dishwashing machine, as mentioned.

The described device is particularly suited for the rapid preparation of French fries made out of potato sticks preliminarily deep-fried in oil. At least when the latter are present slightly cooled in an unfrozen state or even at room temperature, the described device can be used to achieve a preparation time of less than one minute.

In addition to French fries, the described device can also be used to prepare other foodstuffs, in particular those that have been preliminarily deep-fried in hot oil like French fries.

The described device does not depend on the type of foodstuff packaging, but is provided in particular for use in preparing foodstuffs packaged in flexible portion bags, wherein the user must open these bags by hand. The portion bags preferably have the information necessary for optimal preparation with the device printed on them, namely in a form legible for the user, but at the very least in the form of a barcode that can be read in using the barcode reader provided on the device itself.

What is claimed is:

1. Device for the automated, batch-wise preparation of foodstuffs such as French fries out of potato sticks preliminarily deep-fried in oil or the like by baking in a furnace cell (15), wherein the furnace cell (15) is enveloped by a casing (1) provided with a barcode reader (9), which is connected with a controller (44), characterized in that the controller (44) only approves or disapproves the activation of the device as a function of the information contained in the respectively read barcode, and through comparison with previously stored data, if the expiration date of the foodstuffs has not yet been exceeded, the respective package is not a foreign package, and the respective package has not already been used, and that the controller otherwise regulates the baking time and/or the baking temperature and/or a preheating temperature.

2. Device according to claim 1, characterized in that the furnace cell (15) can be preheated and is provided with ventilation means (24, 25, 31–39), and that the furnace cell (15) can be filled and emptied based on the fall-through principal, and exhibits an automatically activated upper (20) and lower (22) sealing element).

3. Device according to claim 2, characterized in that the ventilation means (24, 25, 31–39) in the furnace cell (15) can be used to generate a hot air stream with a volumetric flow of between 12 m$^3$/h and 16 m$^3$/h, in particular of 14 m$^3$/h.

4. Device according to claim 1, characterized in that a casing (1) is provided around the furnace cell (15), insulating it to the outside against the heat, wherein the casing has an upper fill hole (2) and a lower discharge hole (4) for the foodstuffs, and is provided with controls and/or displays.

5. Device according to claim 1, characterized in that it is designed as a tabletop model with a height of less than 60 cm.

6. Procedure for the automated, portion-by-portion preparation of foodstuffs like French fries out of potato sticks or the like preliminarily deep-fried in oil via baking in a furnace cell (15), characterized in that a portion of the foodstuffs is removed from a package provided with a barcode and filled into the furnace cell, that the barcode on the package is read into a controller (44) of the furnace cell by means of a barcode reader, that the furnace cell controller computes an individual baking program for the specified foodstuff portion from the data read in, and that the furnace cell subsequently is put into operation by the controller according to this program, wherein the controller only approves or disapproves the activation of the furnace cell as a function of the information contained in the respectively read barcode, and through comparison with previously stored data, if the expiration date of the foodstuffs has not yet been exceeded, the respective package is not a foreign package, and the respective package has not already been used.

* * * * *